United States Patent [19]

Yeakley

[11] Patent Number: 5,242,259
[45] Date of Patent: Sep. 7, 1993

[54] COMPLIANT GRIPPER MECHANISM FOR ROBOTIC MAGNETIC TAPE CARTRIDGE HANDLING SYSTEM

[75] Inventor: Lester M. Yeakley, Boulder, Colo.

[73] Assignee: Storage Technology Corporation, Louisville, Colo.

[21] Appl. No.: 819,845

[22] Filed: Jan. 13, 1992

[51] Int. Cl.$^5$ .............................................. B25T 15/00
[52] U.S. Cl. .................... 414/751; 294/86.4; 414/280; 901/39
[58] Field of Search ............... 414/729, 753, 749, 751, 414/280, 661, 932; 901/21, 16, 31, 32, 37, 39; 74/479, 469, 89.2, 89.21, 89.22; 294/99.1, 86, 4, 100, 88, 115

[56] References Cited

U.S. PATENT DOCUMENTS

| | | | |
|---|---|---|---|
| 4,566,346 | 1/1986 | Petiteau | 414/749 X |
| 4,618,303 | 10/1986 | Irie | 414/753 X |
| 4,629,385 | 12/1986 | Irie | 414/753 X |
| 4,820,109 | 4/1989 | Witt | 414/282 |

Primary Examiner—Michael S. Huppert
Assistant Examiner—Donald W. Underwood
Attorney, Agent, or Firm—Duft, Graziano & Forest

[57] ABSTRACT

The gripper mechanism is housed in a substantially rectangular box-like enclosure and includes a plurality of guide rails to align and support an object retrieved from an object storage location by the finger gripper mechanism. The finger gripper mechanism is attached to a carriage which functions to translate the finger gripper mechanism from a position proximate to the object storage location to a position within the enclosure. A degree of compliance between the gripper fingers and the object in the selected object storage location is provided by a centering spring that functions to couple the finger gripper mechanism to the carriage.

16 Claims, 9 Drawing Sheets

COMPLIANT GRIPPER MECHANISM FOR ROBOTIC MAGNETIC TAPE CARTRIDGE HANDLING SYSTEM

CROSS REFERENCE TO RELATED APPLICATIONS

This application is related to U.S. patent application Ser. No. 07/819,279 titled "Cartridge Positioning Mechanism for Robotic Magnetic Tape Cartridge Handling System" and filed on Jan. 13, 1992, U.S. patent application Ser. No. 07/820,099 titled "Tractor Mechanism for Robotic Magnetic Tape Cartridge Handling System" and filed on Jan. 13, 1992, U.S. patent application Ser. No. 07/819,782 titled "Finger Gripper Mechanism for Robotic Magnetic Tape Cartridge Handling System" and filed on Jan. 13, 1992.

FIELD OF THE INVENTION

This invention relates to automated object handling systems and, in particular, to a lightweight magnetic tape cartridge gripper mechanism that includes a compliant finger gripper positioning mechanism for retrieving magnetic tape cartridges from storage locations within an automated magnetic tape cartridge library system.

PROBLEM

It is a problem in the field of automated object handling systems to produce a robot mechanism that is inexpensive, lightweight, and which operates at a high rate of speed. A typical object handling systems is an automated magnetic tape cartridge handling system which operates to store and retrieve a large number of magnetic tape cartridges of the 3480-type format for an associated host processor. An example of such an automated magnetic tape cartridge handling system is the 4400 Automated Cartridge System (ASC) manufactured by Storage Technology Corporation of Louisville, Colo. The 4400 Automated Cartridge System includes two concentric cylindrical arrays of magnetic tape cartridge storage locations for storing a large number of magnetic tape cartridges. Each cartridge storage location in the two cylindrical arrays opens into the space between the two concentric cylindrical arrays.

The 4400 Automated Cartridge System is equipped with a robotic cartridge handling mechanism that includes a support column located at the center of the concentric cylinders and having a cartridge retrieval mechanism positioning arm rotatably attached thereto. The rotatable positioning arm supports a cartridge retrieval mechanism that moves in the space between the two concentric cylinders to access the magnetic tape cartridges stored in the cartridge storage locations in the two concentric cylinders. The cartridge retrieval mechanism includes a gripper mechanism consisting of a pair of fingers that are driven by a lead screw and a motor. The rotation of the lead screw causes the pair of fingers to tightly grasp a magnetic tape cartridge that is stored in a selected one of these cartridge storage locations. The force exerted by the fingers on the magnetic tape cartridge is of sufficient magnitude to securely maintain the magnetic tape cartridge in a fixed alignment with reference to the gripper mechanism. In order to exert sufficient force to prevent any movement of the magnetic tape cartridge, the gripper mechanism must be large, the motor required to drive the gripper mechanism must be of substantial size and consumes a significant amount of power.

A significant disadvantage of such a robust gripper mechanism is that its weight, being placed at the distal end of a rotating positioning arm, creates a sizeable force on the center pivot support column which must maintain the gripper mechanism in a precise orientation with respect to the magnetic tape cartridge storage locations in the two concentric cylindrical arrays. As the weight of the gripper mechanism increases, so must the mass of the rotating positioning arm increase in order to support and precisely position the gripper mechanism. Any increase in the mass of these elements requires a commensurate increase in the size of the motors used to drive these elements which further limits the speed with which these elements can be moved within the automated cartridge library system. Therefore, it is desirable to minimize the size and weight of the gripper mechanism in order to enable a corresponding reduction in the size and mass of the other support elements of the robotic cartridge retrieval mechanism. A reduction in the complexity of the gripper mechanism also reduces the cost of manufacture and maintenance of such a mechanism. Therefore, it is desirable to simplify and reduce the weight of the gripper mechanism in a object retrieval system, especially where the gripper mechanism is placed at the distal end of an arm used to position the gripper mechanism in front of an object storage location.

SOLUTION

The above described problems are solved and a technical advance achieved in the field by the compliant gripper mechanism, for an object handling system that automatically positions the gripper mechanism in reference to an object stored in a selected object storage location. This apparatus comprises a mechanically simple and lightweight gripper mechanism for use with a robotic object handling system to retrieve objects from a plurality of object storage locations. In particular, the gripper mechanism includes two fingers hingeably attached to a support and operable by means of a spring to grasp an object with a predetermined amount of force and a solenoid to open the fingers and release the object. Also attached to the fingers is a loading linkage mechanism that exerts a closing force on the fingers in excess of the predetermined closing force when the object is attempted to be removed from between the fingers. The loading linkage mechanism dynamically adjusts the magnitude of the force applied to the fingers as a function of the force applied to the object to remove it from between the fingers. Therefore, the greater the force placed on the object by an external source, the greater the force applied by the loading linkage mechanism to retain the object between the fingers. The finger gripper mechanism makes use of a spring and a simple lightweight solenoid to operate the fingers and therefore requires little energy to operate, while the loading linkage mechanism requires no additional energy to operate.

The gripper mechanism is housed in a substantially rectangular box-like enclosure and includes a plurality of guide rails to align and support an object retrieved from an object storage location by the finger gripper mechanism. The finger gripper mechanism is attached to a carriage which is moveable along one axis of the rectangular enclosure on a pair of tracks, which tracks are located one on each of two opposite sides of the interior of the enclosure. The carriage rides on these tracks and is transported from a retracted position entirely within the enclosure to an activated position juxtaposed to an opening in the enclosure by a tractor mechanism that makes use of a pair of toothed belts, each belt being juxtaposed along the length of one of the tracks on which the carriage slides. The use of the two toothed belts enables the precise positioning of the finger gripper mechanism and prevents the carriage from binding as it slides along the pair of tracks.

Interposed between the walls of the enclosure and the finger gripper mechanism, extending from the opening into the interior of the enclosure, along each of the four interior corners of the enclosure, are located compliant guides which support the object transported by the carriage with its finger gripper mechanism as the object is retrieved from its object storage location and retracted into the enclosure for relocation by a robot arm mechanism. Each of these four compliant guides consist of an elongated L-shaped guide finger that is attached to the enclosure by a spring mechanism to enable the guide finger to translate in directions that are normal to the opening in the enclosure. The end of the guide fingers adjacent the opening in the enclosure are tapered in order to provide a funneling capability to account for misalignments between the object that is retrieved and the precise center lines of the enclosure.

The finger gripper mechanism is transported with the carriage to its position proximate to the opening in the enclosure where it encounters and grasps the object to be retrieved. The two fingers of the finger gripper mechanism close on the object to securely hold the object with a force of predetermined magnitude. The tractor mechanism retracts the carriage and finger gripper mechanism into the enclosure where the object encounters the guide fingers of the four compliant guides, which function to support the object as it is being retrieved into the enclosure. Any misalignment between the object and the enclosure is compensated for by the guide fingers which translate in the direction of the misalignment when they encounter the object being retrieved, in order to support the object and to guide it toward the center line position within the enclosure. The spring mechanism attached to each of the guide fingers enables the guide fingers to be translated to the edge of the enclosure in order to capture the object as it is being retrieved from the object storage location. The spring mechanism also functions to automatically reposition the object once it clears the object storage location to a position that is substantially centered within the enclosure.

A second degree of compliance between the gripper fingers and the object in the selected object storage location is provided by a centering spring that functions to couple the finger gripper mechanism to the carriage. A misalignment between the gripper fingers and the object is first compensated for by the guides located in the enclosure. When greater than a predetermined force is created by the misalignment, the excess force is transmitted through the finger gripper mechanism to the centering spring which provides a certain additional amount of compliance. In particular, the finger gripper mechanism can move with respect to the carriage in response to the transmitted force due to the use of the centering spring that loosely couples the finger gripper mechanism to the carriage. The finger gripper mechanism is repositioned by the guides when the object is retrieved into the enclosure.

Thus, this gripper mechanism is simpler in construction, lighter in weight than prior art gripper mechanisms and enables a corresponding reduction in the size and weight of the associated robotic gripper mechanism positioning arm. The gripper mechanism is also designed to be simple to assemble without the use of fasteners.

BRIEF DESCRIPTION OF THE DRAWING

FIG. 10 illustrates additional details of the finger gripper mechanism; and

DETAILED DESCRIPTION

Figure 1:
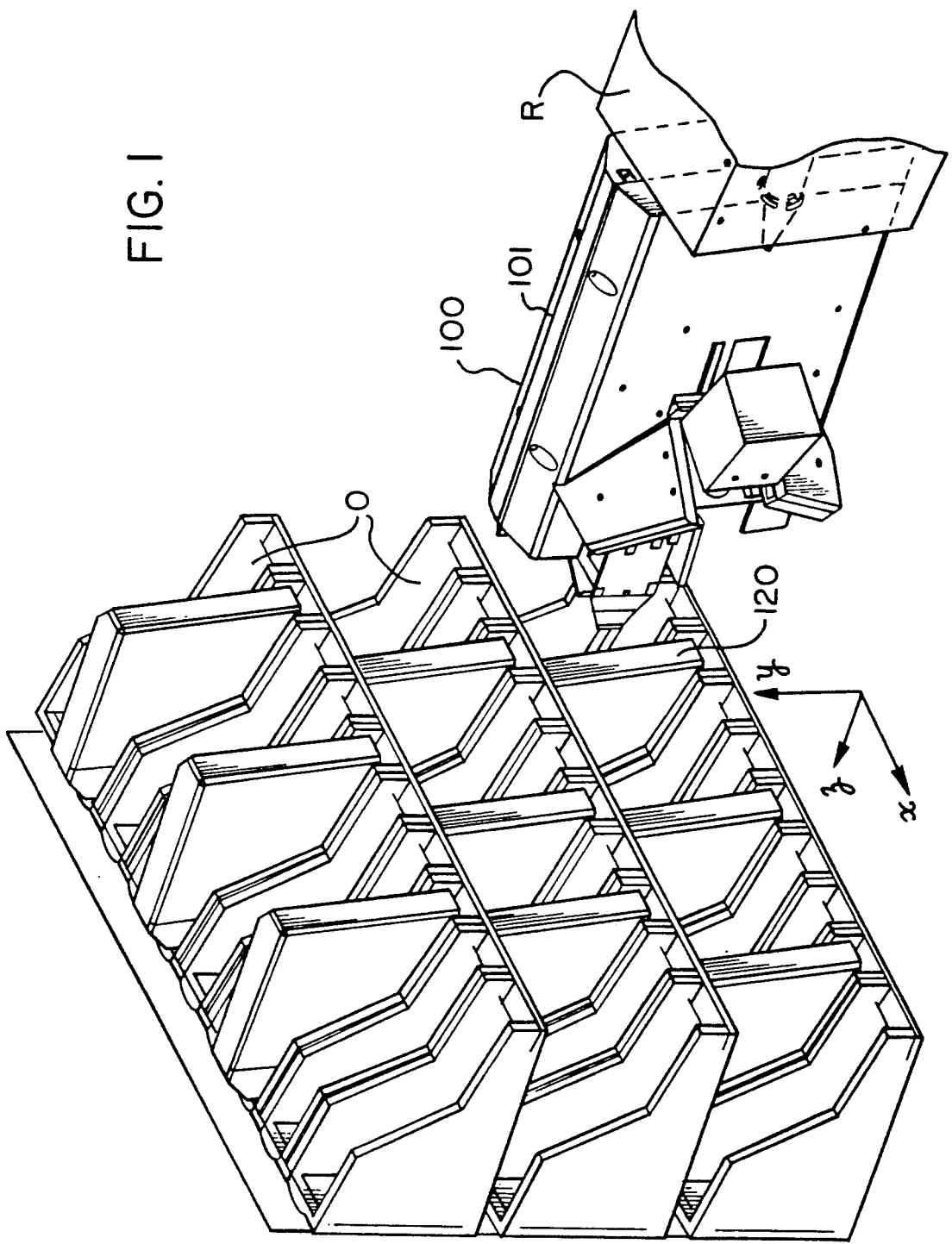
FIG. 1 illustrates a perspective view of the gripper mechanism of the present invention.
Figure 2:
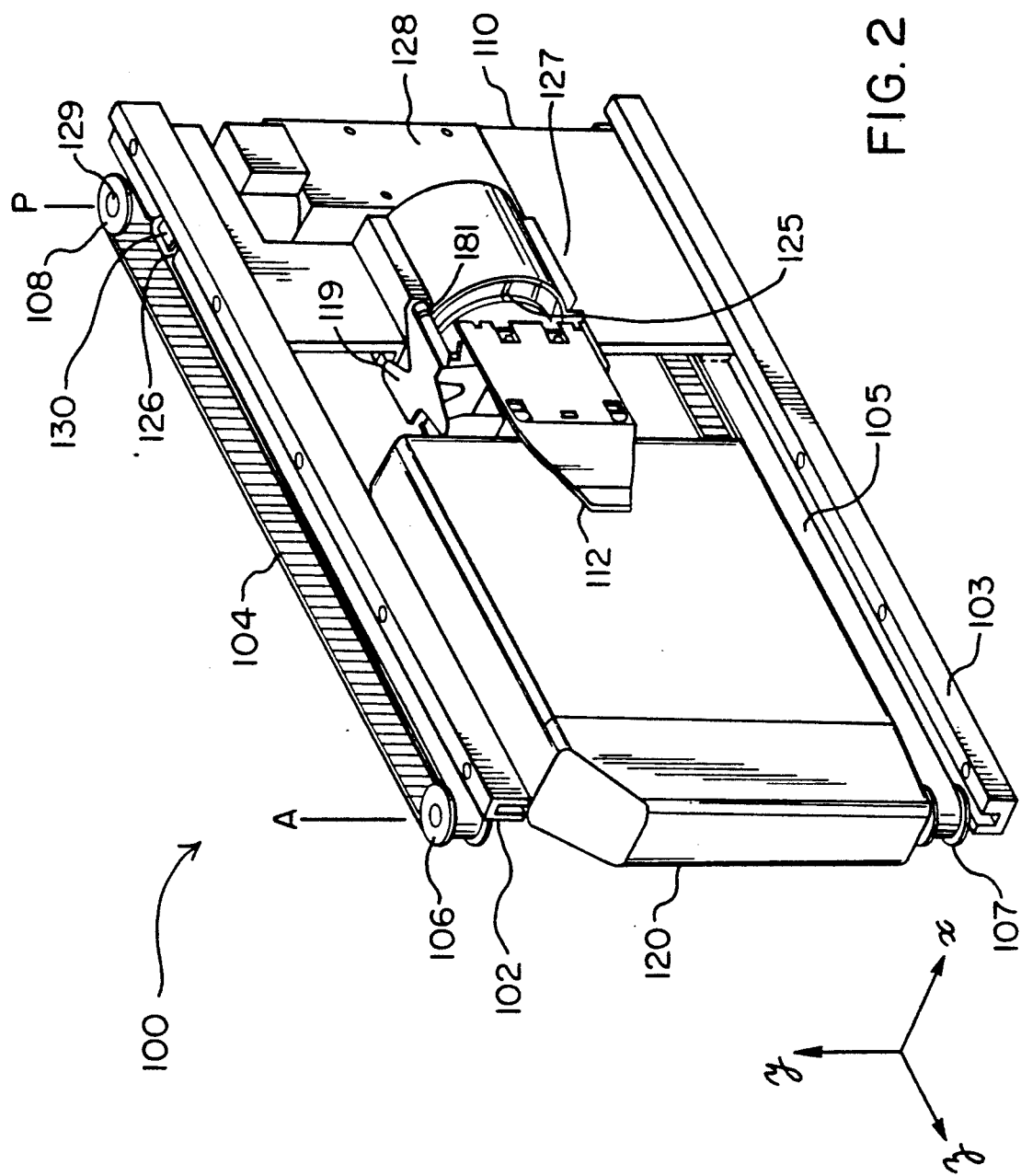
FIG. 2 illustrates a perspective view of the gripper mechanism with the enclosure removed therefrom.
Figure 7:
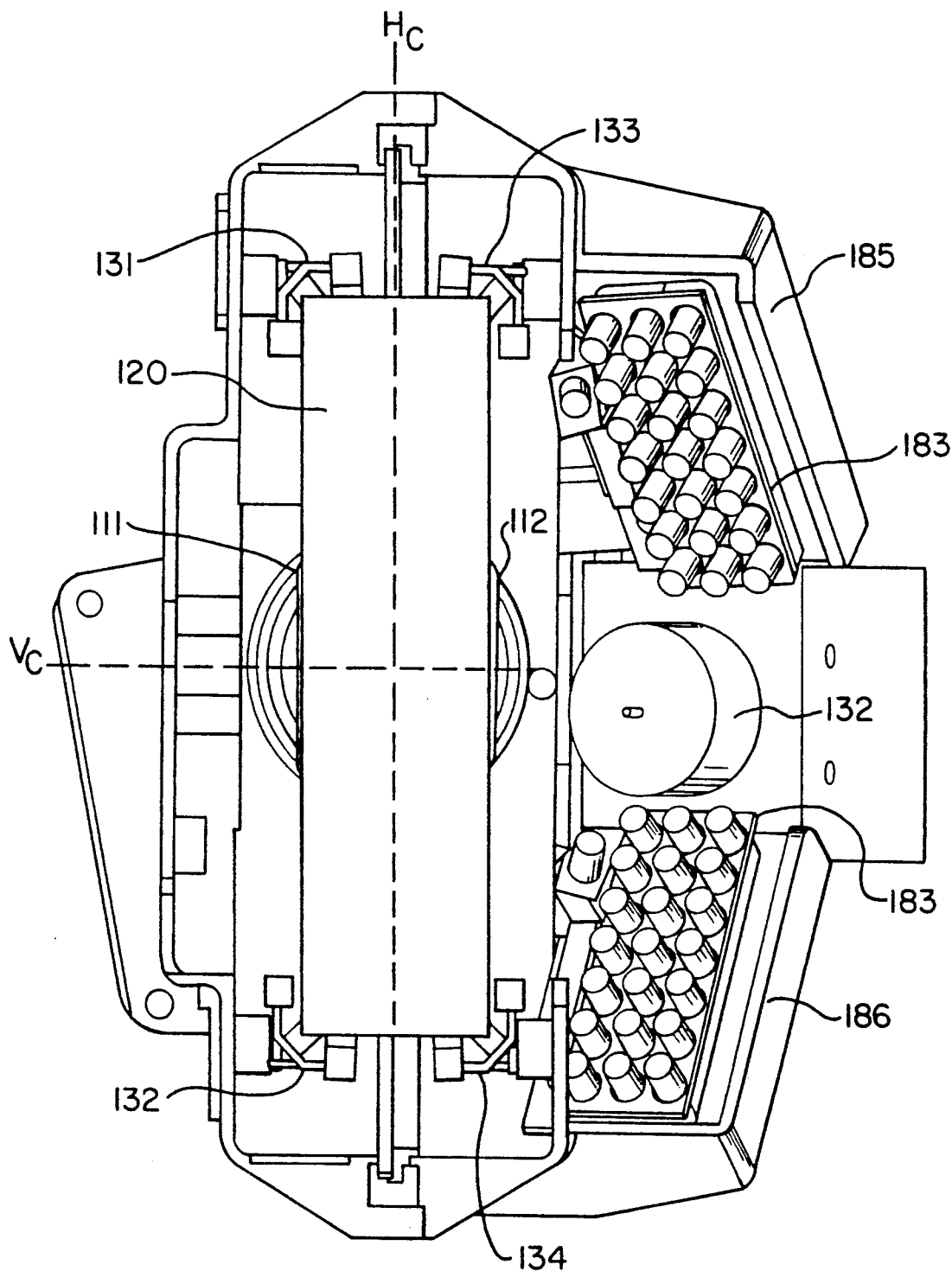
FIG. 7 illustrates an end view of the opening in the enclosure and the guides contained in the enclosure.

FIGS. 1 and 2 illustrate perspective views and FIG. 7 illustrates an end view of the gripper mechanism of the present apparatus. Gripper mechanism 100 is typically attached to a robotic positioning mechanism, such as at the distal end of a rotating positioning arm (R) and is used to retrieve objects 120 from object storage locations 0. In the preferred embodiment disclosed herein, gripper mechanism 100 is attached to a robotic cartridge retrieval mechanism R and retrieves magnetic tape cartridges 120 from cartridge storage locations 0. Enclosure 101 completely encloses the moving parts of the gripper mechanism 100 and functions as a support for the various elements contained therein as is described in detail below. A set of Cartesian coordinates is drawn on FIGS. 1 and 2 in order to assist with the understanding of the interrelationship of the various elements contained in this apparatus.

Enclosure 101 consists of a substantially rectangular box-like structure that contains an opening in one end (A) thereof, which opening comprises a plane in the x and y coordinate directions. The opening is selected to be large enough to enable the gripper mechanism to pass the magnetic tape cartridge 120 through the opening with sufficient extra room provided in both x and y directions to account for any misalignment between the center lines $V_c$, $H_c$ of the opening in the enclosure 101 of the gripper mechanism and the center lines of cartridge 120 as it is stored in cartridge storage location 0. It is expected that the robot arm mechanism R positions the enclosure 101 with its included gripper fingers 111, 112 juxtaposed to a cartridge 120 to be retrieved from a selected cartridge storage location 0 with a fairly high degree of precision. However, since the robot arm mechanism R is a mechanical apparatus, it is expected that a certain amount of misalignment between the gripper fingers 111, 112 and cartridge 120 is encountered during normal operation. The gripper fingers 111, 112 and their associated mechanisms (collectively called finger gripper mechanism 127) are designed to be flexibly compliant in order to grasp the cartridge 120 and, at the same time automatically realign to compensate for misalignment between the vertical center line $V_c$ and the horizontal center line $H_c$ of gripper fingers 111, 112 and the corresponding center lines (not shown) of cartridge 120. When gripper fingers 111, 112 grasp cartridge 120 and begin to extract cartridge 120 from cartridge storage location 0, cartridge 120 is automatically aligned with the opening in enclosure 101 and centered therein. This is accomplished by the use of a plurality of compliant guides 131–134 which function to guide cartridge 120 into the opening and center it therein once cartridge 120 has been completely withdrawn from cartridge storage location 0 and drawn in its entirety into enclosure 101. The guides 131–134 also function to support cartridge 120 to thereby reduce the amount of gripper force required to be produced by finger gripper mechanism 127 and to reduce the required precision and rigidity of finger gripper mechanism 127.

Complaint Guides

Figure 6:
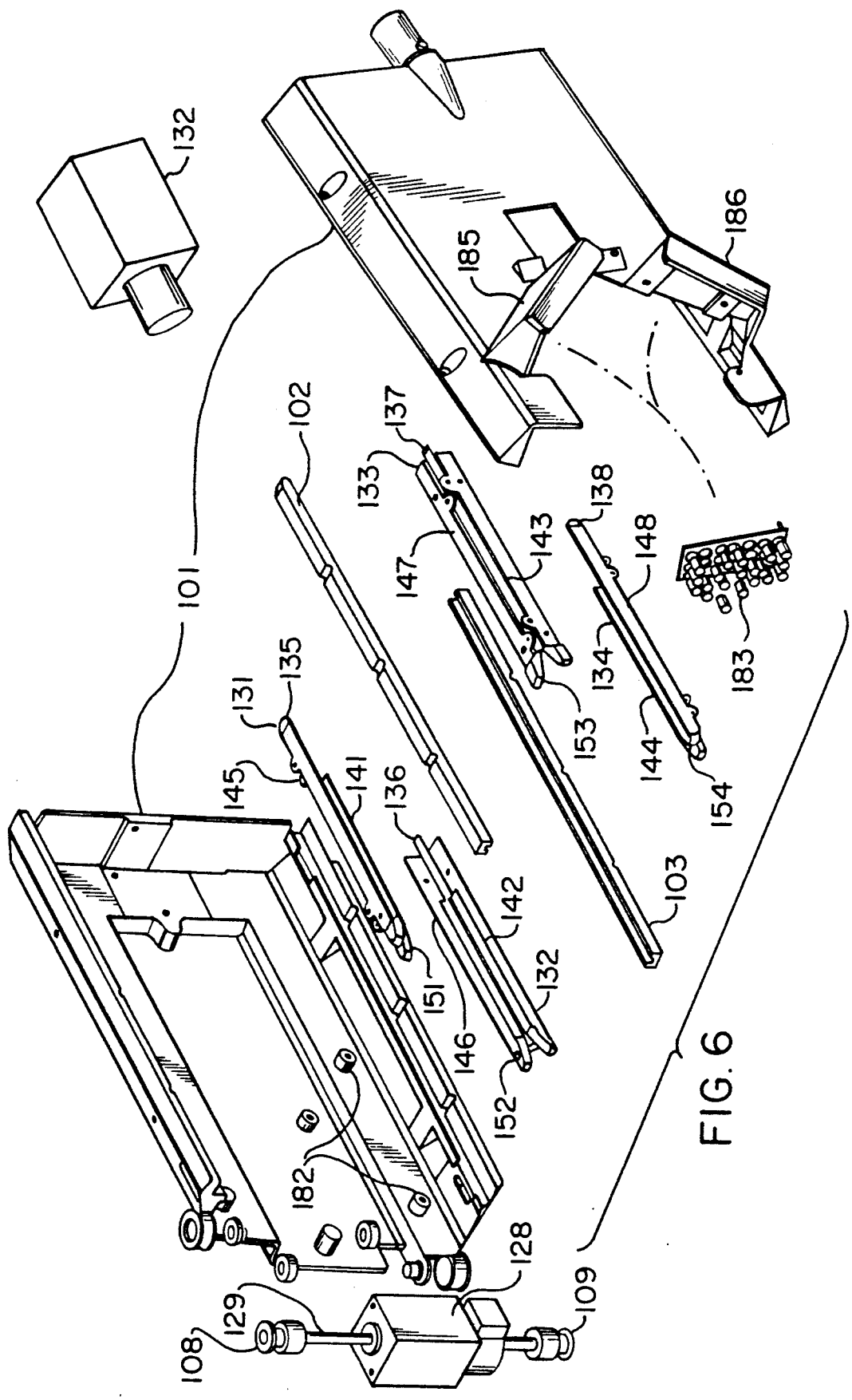
FIG. 6 illustrates an exploded view of the tractor mechanism, guide fingers and enclosure.

The guides 131–134 (FIGS. 6 and 7) consist of a plurality of spring loaded tapered elements, in the preferred embodiment being four guides, each of which is located along an interior corner edge of enclosure 101 and extends from opening end A of enclosure 101 to interior rear end P of enclosure 101. In particular, the guides 131–134 extend from the opening end A of enclosure 101 a distance sufficient to support cartridge 120. The guides 131–134 are attached to enclosure 101 via fasteners (not shown) and standoffs 182 to be fixed in a position that creates a substantially rectangular pocket to receive the substantially rectangular cartridge 120 and reposition cartridge 120 in a centered location once it is retrieved into enclosure 101. As illustrated in FIGS. 6 and 7, guides 131–134 include L-shaped guide fingers 141–144, attached to spring mechanisms 135–138 which are in turn attached to attachment plates 145–148. These elements are illustrated as a unitary structure, but can be separate interconnected elements. The distal end A of the guide fingers 141–144 adjacent to the opening in enclosure 101 include a tapered segment 151–154 to provide an increased aperture to thereby funnel cartridge 120 into the opening of enclosure 101 as it is withdrawn from object storage location 0. Spring mechanisms 135–138 are deformable via compression to enable tapered segments 151–154 to align with cartridge 120 in object storage location 0. Spring mechanisms 135–138 enable guide fingers 141–144 to reposition in both x axis and y axis directions in response to cartridge 120 contacting guide fingers 141–144.

Thus, when gripper fingers 111, 112 and enclosure 101 are positioned opposite a cartridge 120 in the selected cartridge storage location 0, carriage 110 is transported to the opening in enclosure 101 to extend gripper fingers 112 through the opening in enclosure 101 to contact cartridge 120. If cartridge 120 and enclosure 101 are not in perfect alignment, finger gripper mechanism 127 is compliant and the contacting of gripper fingers 111, 112 with cartridge 120 causes finger gripper mechanism 127 to be pulled in a direction that causes gripper fingers 111, 112 to enclose the sides of the cartridge 120 therebetween. The finger gripper mechanism 127 then closes gripper fingers 111, 112 with sufficient force to securely grasp cartridge 120, at which time gripper mechanism 127 is retracted into enclosure 101 by moving carriage 110 in the $-z$ direction. A misalignment between cartridge 120 and the center lines $V_c$, $H_c$ of the opening in enclosure 101 causes cartridge 120 to come into contact with the tapered segments 151–154 of guide fingers 141–144 of guides 131–134 located along the inside corners of enclosure 101. The tapered segments 151–154 of guide fingers 141–144 increase the effective aperture presented to cartridge 120 by guides 131–134 and when cartridge 120 comes in contact with a tapered end 151–154 of a guide finger 141–144, it causes compression of the associated spring 135–138 to thereby align guide fingers 141–144 of guides 131–134 with a corresponding edge of cartridge 120. Attachment plates 145–148 provide a mechanical stop to limit the movement of guide fingers 141–144 in both x axis and y axis directions. Once the cartridge 120 clears cartridge storage location 0, the force exerted by compressed springs 135–138 on corresponding guide fingers 141–144 causes cartridge 120 to be repositioned to a location where the force exerted on cartridge 120 by the plurality of guide fingers 141–144 is reduced to that which is required to support cartridge 120 in both x axis and y axis directions. This position of support force represents the center lines $V_c$, $H_c$ of the opening in both x axis and y axis directions. Springs 135–138 are designed to preload guide fingers 141–144 against attachment plates 145–148 to form a pocket that is slightly larger than cartridge 120. Springs 135–138 do not act against each other when cartridge 120 is retrieved into this pocket, and cartridge 120 is free.

In addition to centering cartridge 120 within enclosure 101, guides 131–134 also function to provide support to cartridge 120 as it is removed from cartridge storage location 0, retrieved into enclosure 101, transported to a new location and deposited there. Therefore, the force required to be applied to cartridge 120 by gripper fingers 111, 112 of gripper mechanism 100 is reduced since gripper fingers 111, 112 do not have to apply sufficient force to cartridge 120 to prevent its movement in both x axis and y axis directions. Instead, object storage location 0 supports cartridge 120 as it is being extracted therefrom and finger gripper mechanism 127 simply holds cartridge 120 with sufficient force to enable it to be extracted from object storage location 0. The end of cartridge 120 facing gripper mechanism 100 encounters guide fingers 141–144 located within enclosure 101 prior to cartridge 120 being fully extracted from cartridge storage location 0 and cartridge 120 is thence supported by guide fingers 131–134. Therefore, carriage 110 with its finger gripper mechanism 127 functions to slide cartridge 120 from cartridge storage location 0 on to guide fingers 141–144 of guides 131–134 of enclosure 101 and finger gripper mechanism 127 must therefore only provide sufficient gripping force on cartridge 120 to enable cartridge 120 to slide from one location to another in the $-z$ axis direction without the friction forces encountered in this operation causing cartridge 120 to come free from finger gripper mechanism 127.

Carriage Mechanism

The substantially rectangular space encircled by guides 131–134 represents the cartridge movement space and must remain clear of all obstructions in order to enable cartridge 120 to freely move in and out of enclosure 101. Therefore, finger gripper mechanism 127 is attached to carriage 110 which is supported by a pair of tracks 102, 103 which are located within enclosure 101 and external to the cartridge movement space defined by the position of guides 131-134. The tracks 102, 103 are located on opposite interior sides of enclosure 101 and extend from the opening end A to the interior rear end P of enclosure 101 in an orientation to enable finger gripper mechanism 127 to travel in −z axis and +z axis directions and centered in both x and y axes within the opening of enclosure 101. The use of a pair of tracks 102, 103 enables carriage 110 to be supported along the full length of its travel in a manner that produces minimum friction force on the mechanism and yet securely supports finger gripper mechanism 127.

Finger gripper mechanism 127 is connected to a carriage 110 which functions to transport finger gripper mechanism 127 between its fully extended position at the opening end A of enclosure 101 to its fully retracted position adjacent the rear interior wall end P of enclosure 101. Carriage 110 extends from track 102 to track 103 and is slidably connected to tracks 102, 103. Tracks 102, 103 are U-shaped and receive the substantially rectangular-shaped rail at either end of carriage 110. The tracks 102, 103 are manufactured of a material such as Vespel ® (a trademark of DuPont, Inc.) to provide a surface, having a low coefficient of friction and requiring no lubrication, on which carriage 110 rides. The U-shape of tracks 102, 103 also constrain the horizontal (x axis direction) and vertical (y axis direction) movement of carriage 110 to thereby position carriage 110 along the horizontal (x axis) centerline $H_c$ and vertical centerline $V_c$ of enclosure 101. Carriage 110 functions to transport finger gripper mechanism 127 in the z axis direction, guided in the horizontal (x axis direction) and the vertical (y axis direction) along centerlines $H_c$ and $V_c$, thereby precisely locating finger gripper mechanism 127 within enclosure 101.

Dual Belt Drive Mechanism

The distance of travel required of finger gripper mechanism 127 and the physical space between the two concentric cylinders of cartridge storage locations in which it must operate, requires that the tractor mechanism for finger gripper mechanism 127 must be compact yet have a long stroke. Therefore, carriage 110 cannot be driven directly in line with its center of gravity but must be driven at an offset distance, parallel to but outside of the object handling space. In prior systems, the tractor mechanism was placed to one side of the object handling space, producing a moment on the carriage guide system. To compensate for this force, massive low friction, precision guides such as linear ball bearings were used to support the carriage.

To implement the tractor mechanism in a low cost, simple manner, the tractor mechanism of the present embodiment uses a pair of tracks 102, 103 symmetrically arranged with respect to carriage 110. The motive drive is provided by dual timing belt drives which consist of toothed belts 104, 105 driven by a single motor 128 located at the rear end P of the interior of enclosure 101. Drive motor 128 is attached to enclosure 101 and drives shaft 129 oriented in the y axis direction and aligned with respect to the opening. Drive shaft 129 is attached at its ends to drive gears 108, 109 which mate in well known fashion with the teeth on drive belts 104, 105, respectively. Proximate to the opening of enclosure 101 and at the distal end A of tracks 102, 103 is a pair of freely rotating idler pulleys 106, 107 which also engage toothed belts 104, 105 such that belts 104, 105 form endless loops around gears 108, 106 and 109, 107, respectively. Idler pulleys 106, 107 function to tension toothed belts 104, 105 as well as define the end of travel of carriage 110. As drive motor 128 rotates drive shaft 129, drive gears 108, 109 at either end thereof cause toothed belts 104, 105 to move in synchronized rotation to apply equal displacements to either end of carriage 110 on which finger gripper mechanism 127 rides along tracks 102, 103. The toothed belts 104, 105 also enable drive motor 128 to very precisely position finger gripper mechanism 127 without slippage. Side loads (x axis direction and y axis direction) on carriage 110 are reacted by the "U" shaped tracks 102, 103 as are yaw and roll moments. Pitch moments are reacted by the motor shaft through the pair of synchronized toothed belts 104, 105. This mechanism is simple and compact yet reacts to any side loads, yaw/roll moments.

Figure 8:
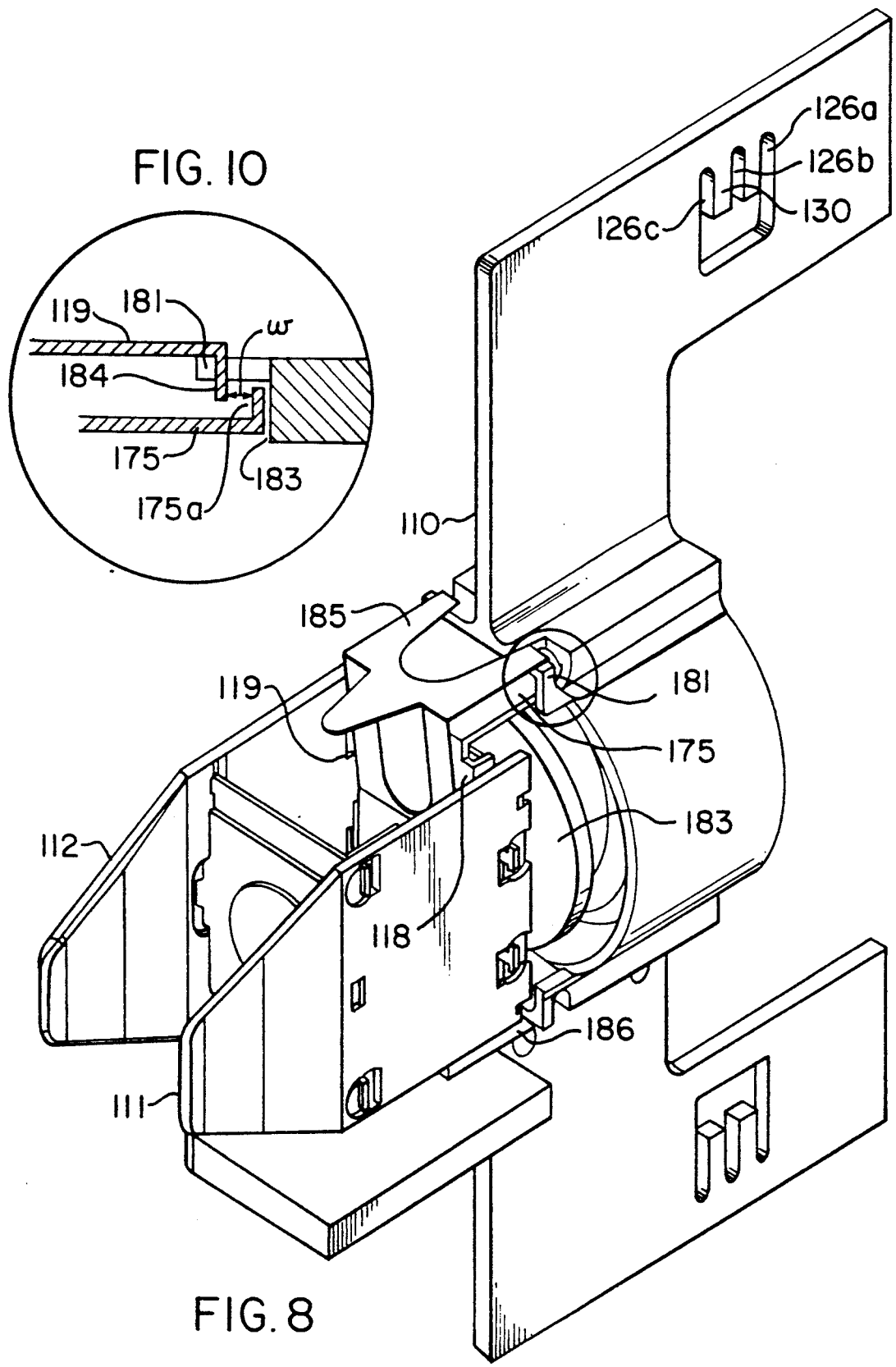
FIG. 8 illustrates the interconnection of the finger gripper mechanism to the carriage.
Figure 9:
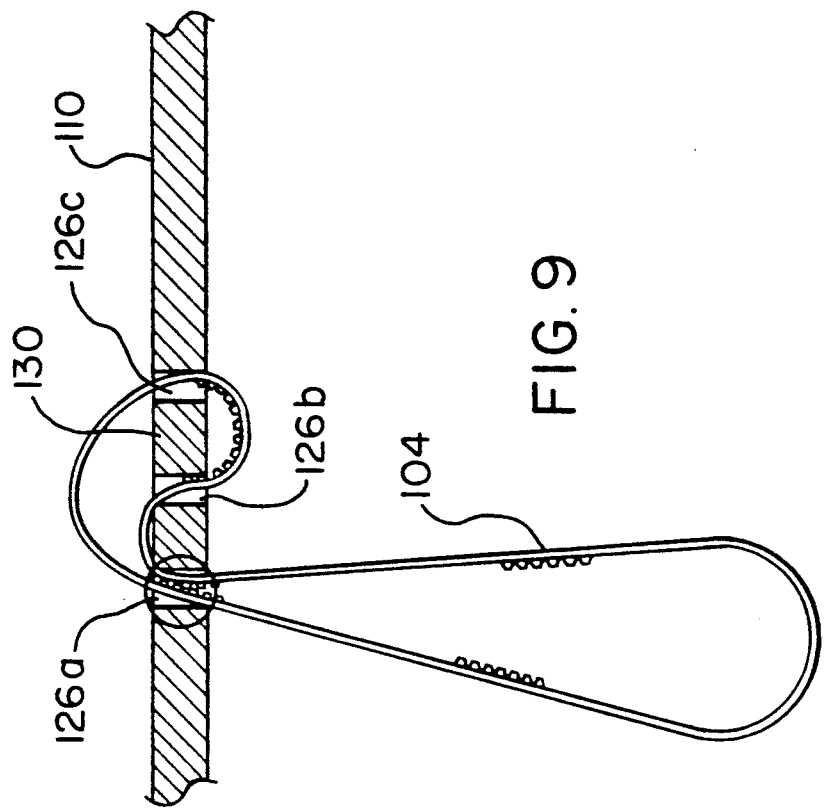
FIG. 9 illustrates further details of the interconnection of the carriage mechanism with the drive belts of the tractor mechanism.
Figure 11:
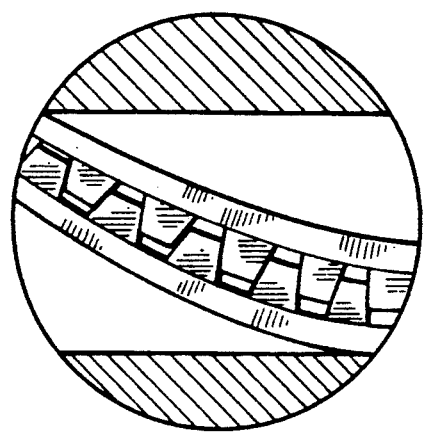
FIG. 11 illustrates additional details of the interconnection of the toothed belts.

Toothed belts 104, 105 are attached to carriage 110 in a simple manner that does not require the use of fasteners (FIG. 9). A tab 130 is provided in carriage 110 at either end thereof, juxtaposed to tracks 102, 103. Tab 130 can be of any shape and as shown in FIG. 8 it is substantially rectangularly shaped. On one side of tab 130, arranged in a straight line therewith, is a notch 126a through which the toothed belt 104, 105 is fed. Thus, toothed belt 104, 105 enters notch 126a, is wrapped over tab 130 via notches 126b, 126c and exits notch 126a. The teeth on toothed belt 104, 105 engage both tab 130 and each other as they pass through notch 126a in carriage 110. This fixedly couples carriage 110 to toothed belts 104, 105 without the use of fasteners. It is evident that the orientation of tab 130 with regard to notch 126a is a matter of design choice and the linear arrangement of tab 130 and notches 126a, 126b, 126c is shown herein as one of the numerous possible configurations.

Finger Gripper Mechanism

Figure 3:
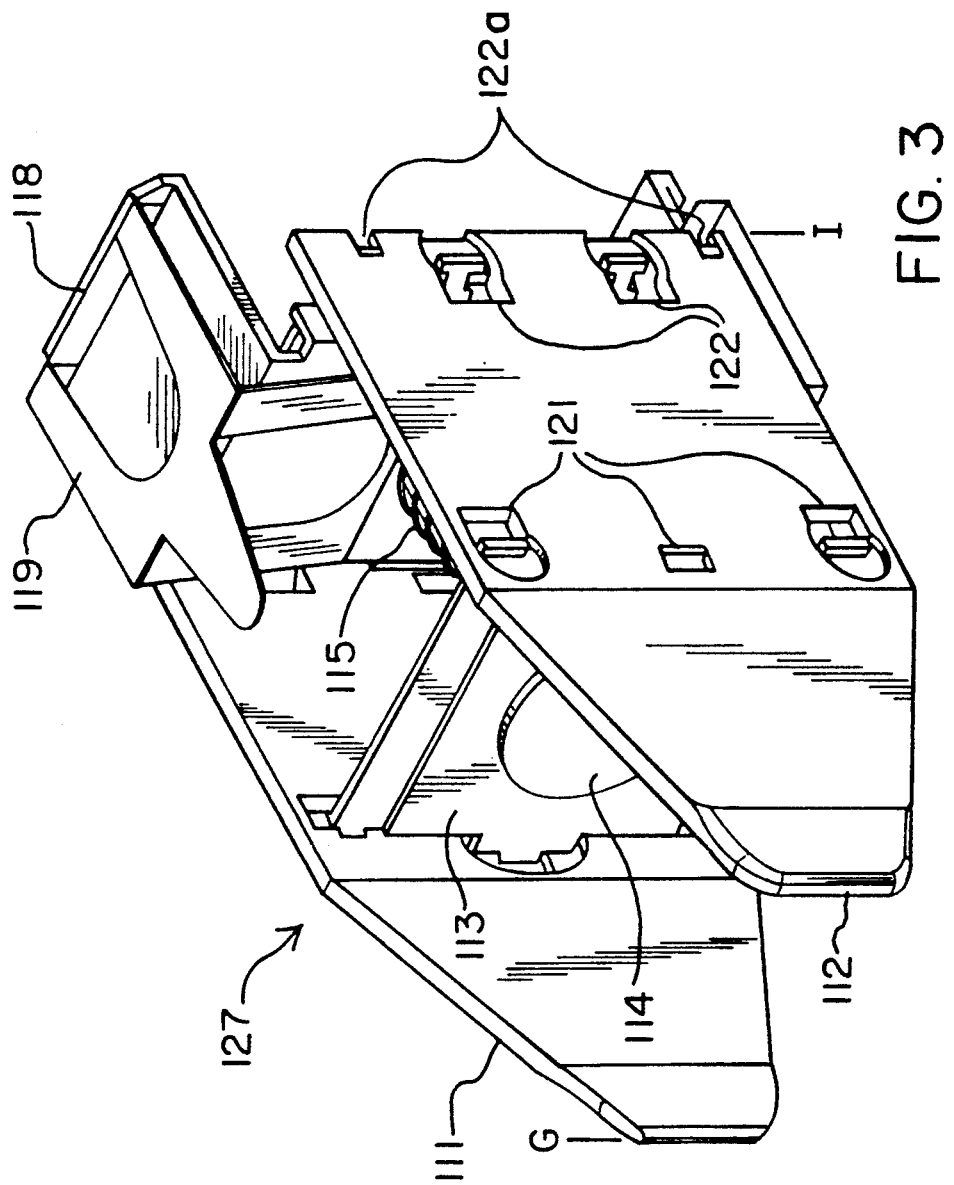
FIGS. 3 and 4 illustrate front and rear perspective views of the finger section of the gripper mechanism absent the enclosure.
Figure 4:
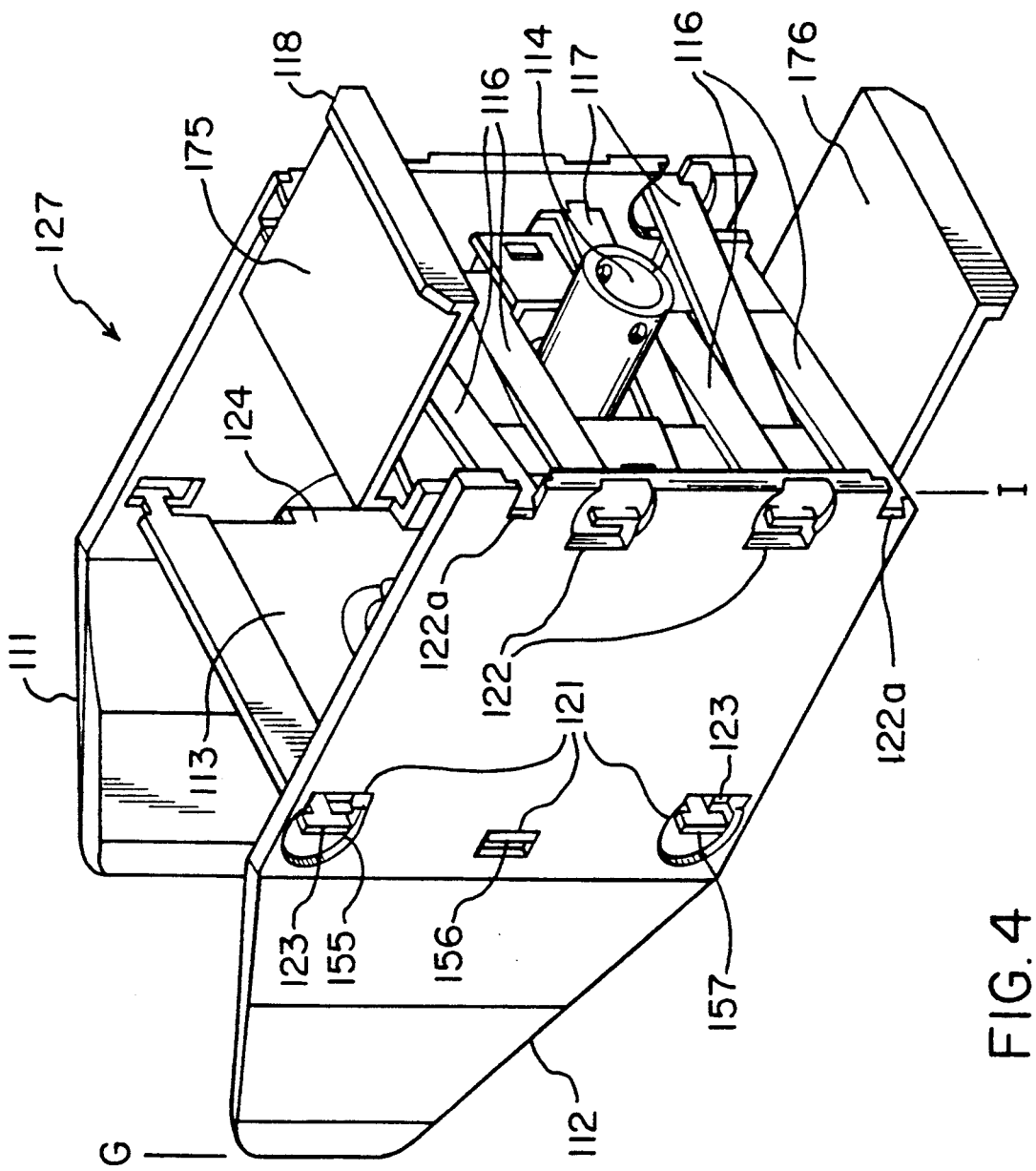
Figure 5:
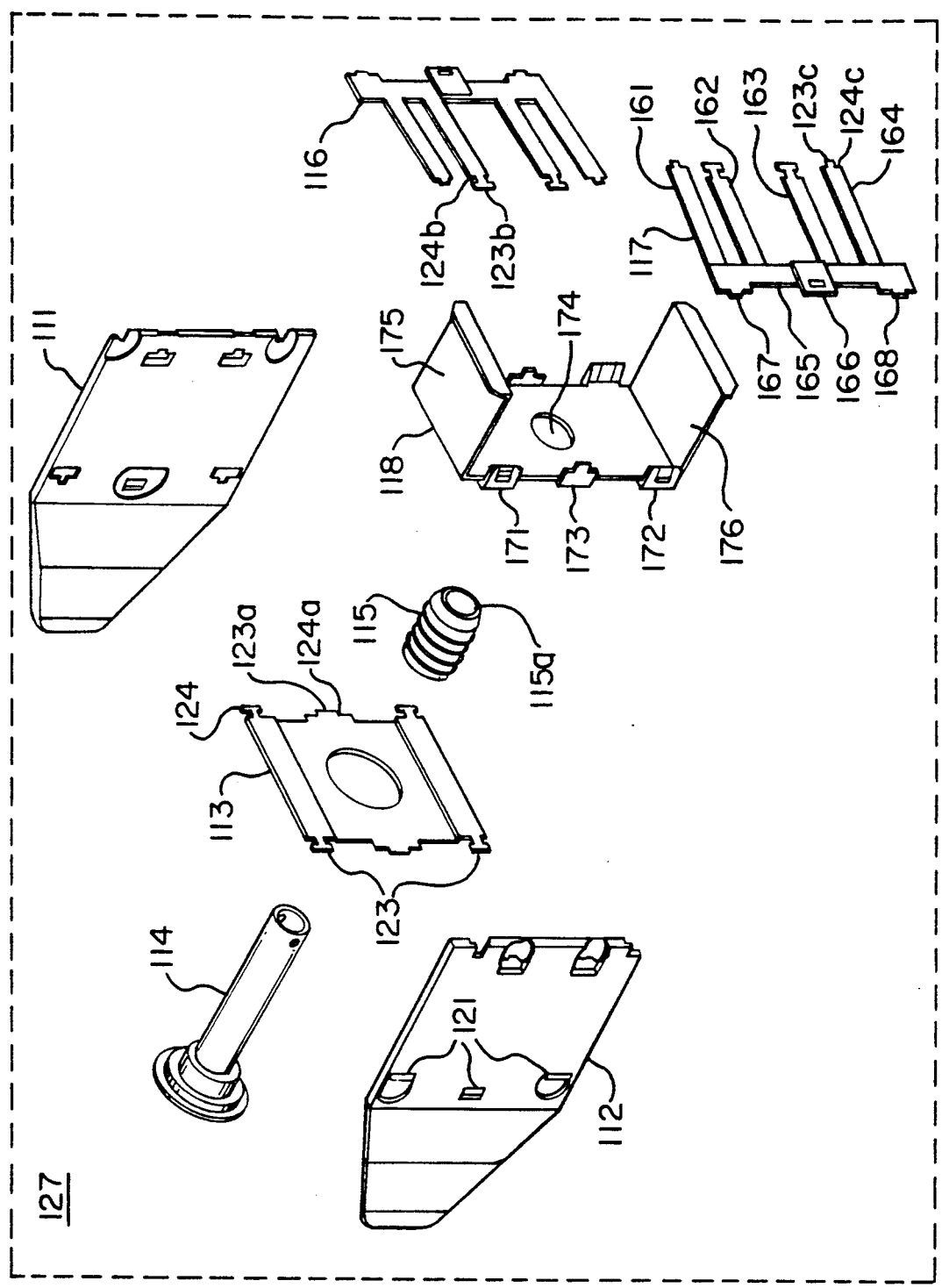
FIG. 5 illustrates an exploded view of the finger section of the gripper mechanism.

The finger gripper mechanism 127 (FIGS. 3-5) itself consists of a pair of gripper fingers 111, 112 hingeably attached to either end of a rectangular support structure 113. Therefore, by applying an outwardly directed force to the interior ends I of gripper fingers 111, 112, the gripping end G of gripper fingers 111, 112 are caused to close on cartridge 120 placed therebetween, since gripper fingers 111, 112 pivot around support structure 113. An outwardly or inwardly directed force applied to the interior ends I of gripper fingers 111, 112 causes gripper fingers 111, 112 to rotate around the hinged connection to support structure 113. The hinge mechanism is designed to be simply assembled, requiring no lubricant, and freely moving. These goals are achieved by the use of a plurality of linearly arranged openings 121 in gripper fingers 111, 112, each of which mates with a corresponding projection on support structure 113 to precisely position gripper fingers 111, 112 with respect to support structure 113 and therefore with respect to each other. The projections on support structure 113 are T-shaped tabs 123 and elongated tabs 123a, the shoulders 124, 124a of which determine the position of gripper fingers 111, 112 in two dimensions (x, y). The interconnection of gripper fingers 111, 112 and support structure 113 is accomplished by offsetting elongated tabs 123a in a z axis direction from T-shaped tabs 123 so that their shoulders 124a and 124 are in alignment. Thus, T-shaped tabs 123 press against openings 121 in a +z axis direction while elongated tabs 123a press against their openings 121 in a −z axis direction. This causes gripper fingers 111, 112 to snap fit with support structure 113. The T-shaped tabs 123 with shoulders 124 and elongated tabs 123a with shoulders 124a enable gripper fingers 111, 112 to rotate hingeably around support structure 113.

Hinge lines similar to those formed between gripper fingers 111, 112 and support structure 113 are formed between gripper finger 111 and loading linkage 117, between gripper finger 112 and loading linkage 116, and between gripper support 118 and loading linkages 116, 117. A compression coil spring 115 placed between gripper support 118 and support structure 113 acts to separate these two elements and close gripper fingers 111, 112 at gripper end G. This closure is accomplished because as support structure 113 moves in the +z axis direction with respect to gripper support 118, gripper fingers 111, 112 also move in the +z axis direction, thereby moving the outer ends of loading linkages 116, 117 in the +z axis direction while the interior ends of loading linkages 116, 117 remain in fixed position by their attachment to gripper support 118. This mechanical interconnection causes loading linkages 116, 117 to rotate about their interior end attachment to gripper support 118, opening gripper fingers 111, 112 at interior end I and closing gripper fingers 111, 112 at gripper end G.

It is the angular relation of loading linkages 116, 117 with respect to gripper support 1118 that produces the mechanical advantage for gripper fingers 111, 112 and makes gripper fingers 111, 112 grip tighter if a force attempts to remove cartridge 120 from between gripper fingers 111, 112. This mechanical advantage allows the use of a smaller spring 115 to close gripper fingers 111, 112 and also a smaller solenoid 125 to compress spring 115 and open gripper fingers 111, 112.

The opening of the gripper fingers 111, 112 is accomplished by solenoid 125 translating support structure 113 in the −z axis direction. This support structure 113 movement is translated by the interaction of the hinges of finger gripper mechanism 127 into x-axis direction motion. In particular, loading linkages 116, 117 couple the interior ends I of gripper fingers 111, 112 to gripper support 118, thereby providing a linkage to translate the movement of solenoid arm 114 into finger movement. Solenoid arm 114 is attached at one end to support structure 113 and passes through an aperture 174 in gripper support 118. A coil spring 115 is placed coaxially around collar 115a which encloses solenoid arm 114 to apply a force between gripper support 118 and support structure 113 to separate these two elements and close gripper fingers 111, 112 at gripper end G. Solenoid 125 overcomes this spring force to open gripper fingers 111, 112. Gripper support 118 includes two arms 175, 176 which, along with compliance spring 119, attach finger gripper mechanism 127 to carriage 110. Loading linkages 116, 117 provide a mechanical advantage in closing gripper fingers 111, 112. Therefore, the spring force that must be produced by spring 115 is smaller as is solenoid 125 which also required less power to operate.

Loading Linkages

Loading linkages 116, 117 consist of a cross bar 165 to which is attached a plurality (4) of fingers 161–164. Two fingers 162, 163 include a T-shaped tab 123b at the distal end thereof to interconnect via shoulder 124b with a corresponding hole 122 in gripper fingers 111, 112. The remaining two fingers 161, 164 have rectangular-shaped tabs 124c on the distal end thereof and shoulders 124c to engage correspondingly shaped slots 122a in gripper fingers 111, 112. The fingers 161–164 are offset in a z-axis direction to press against openings 122, 122a in opposite directions (±z axis) to cause loading linkages 116, 117 to snap fit with gripper fingers 111, 112. The T-shaped tabs 123b with their shoulders 124b and rectangular-shaped tabs 123c with their shoulders 124c enable gripper fingers 111, 112 to hingeably rotate on fingers 161–164 of loading linkages 116, 117. The other end of loading linkages 116, 117 is cross bar 165 which is hingeably attached to gripper support 118. Cross bar 165 includes tabs 167, 168 and hole 166 which couple with projections 171, 172 and 173, respectively on gripper support 118. These elements not only position loading linkages 116, 117 with respect to gripper support 118, but also hingeably interconnect these elements.

In operation, solenoid 125 moves solenoid arm 114 in the −z axis direction, causing support structure 113 to move in that direction. Loading linkages 116, 117 are connected to gripper support 118 which remains stationary. As support structure 113 moves in a −z axis direction, loading linkages 116, 117 pivot on gripper support 118 and pull the interior end I of fingers 111, 112 inwardly together as a function of the distance of travel in the −z axis direction of support structure 113. In addition, by translating solenoid arm 114 in the opposite direction by spring 115, a return force is produced on the interior end I of gripper fingers 111, 112 forcing them open with the amount of force substantially equal to that produced in the closing operation.

A further enhancement provided by the use of loading linkages 116, 117 located at the interior end I of gripper fingers 111, 112, is that loading linkages 116, 117 cause the production of a gripping force which is applied to the interior end I of gripper fingers 111, 112 as a function of the magnitude of force that is applied to the cartridge 120 in order to extract the cartridge 120 from between gripper fingers 111, 112. Therefore, any tendency for cartridge 120 to slide from between gripper fingers 111, 112 or to be forced therefrom by external forces, is automatically compensated for by the use of these loading linkages 116, 117 which function to automatically apply a gripping force which is dependent upon the magnitude of force that is applied to retract cartridge 120 from gripper fingers 111, 112.

Variable Compliance Gripper to Carriage Interconnection

Gripper support 118 is compliantly attached to carriage 110 by centering spring 119. Therefore, gripper fingers 111, 112 and support structure 113 are supported by gripper support 118 but in a manner that enables a certain amount of flexibility in this coupling to enable gripper fingers 111, 112 to translate in both x axis and y axis directions a minimal amount to account for misalignment of gripper fingers 111, 112 with cartridge 120. The loading linkages 116, 117 at the interior end I of gripper fingers 111, 112 are hingeable attached to gripper support 118 and the interior end I of gripper fingers 111, 112 in order to enable loading linkages 116, 117 to pivot as solenoid arm 114 is moved in and out by spring 115 and solenoid 125.

A centering spring 119 is used to provide a compliant interconnection of finger gripper mechanism 127 to carriage 110. The interconnection of these two elements is disclosed in further detail in FIG. 8. Gripper support 118 includes two arms 175, 176 which have flanged ends 175a, 176a to rest against face 183 of carriage 110. Face 183 includes projection 181 which constrains flanged ends 175a, 176a of arms 175, 176 from x axis and y axis motion. Centering spring 119 is U-shaped and also includes flanges 184 on the ends of each arm 185, 186 thereof. Flanges 184 fit over projection 181 from face 183 to hold gripper support 118 against face 183 of carriage 110. Thus, centering spring 119 covers gripper support 118 on three sides and provides a mechanism to spring load gripper support 118 in position against face 183 of carriage 110 and centered in projection 181.

Any misalignment when gripper fingers 111, 112 contact cartridge 120 causes a moment to be transmitted to gripper support 118 to rotate gripper support 118 with respect to face 183 and projection 181 of carriage 110 to translate and realign gripper fingers 111, 112 with respect to cartridge 120. Since gripper support 118 is spring loaded against face 183 of carriage 110, the transmitted moment causes gripper support 118 to be rotated. The amount of rotation of gripper support 118 is limited by centering spring 119, which gripper support 118 comes in contact with after a predetermined distance of travel (w). The extent of movement of gripper support 118 is therefore limited by the dimensions of centering spring (arms 185, 186) and projections 181 from face 183 of carriage 110. Centering spring 119 snaps over projections 181 thereby connecting finger gripper mechanism 127 to carriage 110 without using fasteners.

When finger gripper mechanism 127 retrieves cartridge 120 into enclosure 101, the misalignment between gripper fingers 111, 112 and cartridge 120 that cause gripper support 118 to rotate and realign gripper fingers 111, 112 is corrected by guides 131–134 which realign cartridge 120 and finger gripper mechanism 128 With center lines $V_c$, $H_c$ of enclosure. Guides 131–134 therefore allow gripper support 118 to realign itself with respect to face 183 of carriage 110.

While a specific embodiment of this invention has been disclosed, it is expected that those skilled in the art can and will design alternate embodiments of this invention that fall within the scope of the appended claims.

I claim:

1. In an object handling system that includes a robotic manipulator for transporting objects, an object retrieval apparatus, located at an end of said robotic manipulator, for retrieving an object from an object storage location comprising:
   means for gripping said object to securely hold said object;
   means for translating said gripping means in a direction to remove said object from its object storage location;
   means for flexibly connecting said gripping means to said translating means to enable said gripping means to be displaceable with respect to a predetermined locus on said translating means; and
   means, engagable with said object, for automatically positioning said object as it is removed from said object storage location to a position in alignment with said predetermined locus on said translating means, comprising:
   a plurality of rails, aligned parallel to each other and positioned to form a pocket to receive said object.

2. The apparatus of claim 1 wherein said flexibly connecting means is responsive to a positional misalignment between said object and said predetermined locus on said translating means for enabling said gripping means to displace with respect to said translating means in a direction to compensate for said misalignment when said gripping means contacts said object.

3. The apparatus of claim 2 wherein said flexibly connecting means comprises:
   spring means attached to said gripping means for coupling said gripping means to said translating means.

4. The apparatus of claim 1 wherein said positioning means translates said gripping means to a position in alignment with said predetermined locus on said translating means as said object is moved to said position in alignment with said predetermined locus on said translating means.

5. The apparatus of claim 1 wherein said object comprises a substantially rectangular shaped object, said plurality of rails comprise four rails, aligned to contact a corresponding one of four edges of said substantially rectangular-shaped object as said substantially rectangular-shaped object is withdrawn from said object storage location.

6. The apparatus of claim 1 wherein said positioning means comprises:
   a plurality of springs, each of which is attached to a corresponding one of said plurality of rails, deformable from a preloaded position substantially in alignment with said predetermined locus on said translating means by said object being loaded from said object storage location into said pocket formed by said plurality of rails, and which apply a force to said object in a direction opposite said deformation to place said object substantially in alignment with said predetermined locus on said translating means once said object is removed from said object storage location.

7. The apparatus of claim 6 further comprising:
   means for enclosing said positioning means for providing a rigid frame of reference for said positioning means; and
   wherein said of said plurality of springs have a first end and a second end, where said first end is attached to said enclosing means and said second end is attached to said corresponding rail.

8. The apparatus of claim 1 wherein each of said rails has a first end, proximate to said object storage location, and tapered to funnel said object from said object storage location into contact with said plurality of rails.

9. In an object handling system that includes a robotic manipulator for transporting objects, an object retrieval apparatus, located at an end of said robotic manipulator which positions said object retrieval apparatus opposite an object storage location, for retrieving an object from said object storage location, comprising:
   means for gripping said object to securely hold said object;
   means for translating said gripping means along a path of predetermined extent from a first position juxtaposed to said object storage location, where said gripping means contacts said object, to a second position in a direction to remove said object from its object storage location, comprising:
   carriage means, having first and second ends, for translating between said first and second positions when said object retrieval apparatus is positioned opposite said object storage location;

first and second tracks aligned parallel to each other and parallel to said path for receiving said first and second ends of said carriage means to guide said carriage means along said path;

first and second belt drive means, substantially coextensive with said first and second tracks, respectively, for displacing said carriage means in said direction, which is parallel to said first and second tracks, to cause said carriage means to move along said first and second tracks in said direction;

means for driving said first and second belt means to produce said displacement; and means for flexibly connecting said gripping means to said carriage means to enable said gripping means to be displaced with respect to a predetermined locus on said carriage means; and means, engageable with said object wherein said object comprises a substantially rectangular-shaped object box-like structure, for automatically positioning said object as it is removed from said object storage location to a position in alignment with a predetermined locus on said carriage means, comprising:

a plurality of rails, aligned parallel to each other and positioned to form a pocket to receive said substantially rectangular-shaped object.

10. The apparatus of claim 9 wherein said first and second belt drive means each comprises:

a drive gear means rotatably connected to said driving means and located proximate said second position;

an idler pulley means, rotatable, and located proximate said first position;

toothed belt means, connected to said carriage means, forming a continuous loop encircling and engaging said drive gear means and said idler pulley means; and wherein said driving means rotates said drive gear means, engaging said toothed belt means which translates around said idler pulley means, displacing said attached carriage means along said path.

11. The apparatus of claim 9 wherein said flexibly connecting means is responsive to a positional misalignment between said object and said predetermined locus on said carriage means for enabling said gripping means to translate with respect to said carriage means in a direction to compensate for said misalignment when said gripping means contacts said object.

12. The apparatus of claim 11 wherein said flexibly connecting means comprises:

spring means attached to said gripping means for coupling said gripping means to said carriage means.

13. The apparatus of claim 9 wherein said positioning means enables said gripping means to align with said predetermined locus as said object is moved to said position in alignment with said predetermined locus on said carriage means.

14. The apparatus of claim 9 wherein said plurality of rails comprise four rails, aligned to contact a corresponding one of four edges of said substantially rectangular-shaped object as said substantially rectangular-shaped object is withdrawn from said object storage location.

15. The apparatus of claim 9 wherein said positioning means comprises:

a plurality of springs, each of which is attached to corresponding one of said plurality of rails, deformable from a preloaded position substantially in alignment with said predetermined locus on said carriage means by said substantially rectangular-shaped object being loaded from said object storage location into said pocket formed by said plurality of rails, and which apply a force to said substantially rectangular-shaped object in a direction opposite said deformation to substantially center said substantially rectangular-shaped object in alignment with said predetermined locus on said carriage means once said substantially rectangular-shaped object is removed from said object storage location.

16. The apparatus of claim 15 further comprising:

means for enclosing said positioning means for providing a rigid frame of reference for said positioning means; and wherein each of said plurality of springs have a first end and a second end, where said first end is attached to said enclosing means and said second end is attached to said corresponding rail.

* * * * *